Patented Dec. 11, 1945

2,390,934

UNITED STATES PATENT OFFICE 2,390,934

METHOD OF SEPARATING BUTADIENE AND BUTYLENE FROM HYDROCARBON MIXTURES

Charles L. Gregg, Midland, Mich., assignor to The Dow Chemical Company, Midland, Mich., a corporation of Michigan No Drawing. Application March 3, 1941,
Serial No. 381,544

5 Claims. (Cl. 202—42)

This invention concerns an improved method of separating butadiene from hydrocarbon mixtures comprising the same and a more saturated aliphatic hydrocarbon having four carbon atoms in the molecule. It particularly concerns the separation of butadiene from butylenes to recover each in a form relatively free of the other.

Hydrocarbon mixtures comprising butadiene-1.3 and butylenes are obtainable at low cost by the dehydrogenation of butane or butylene and by the pyrolysis of other organic starting materials such as petroleum fractions, coal tar distillate, etc. Frequently the crude products comprise various other paraffinic, olefinic, diolefinic, and acetylenic hydrocarbons such as methane, ethane, propane, butane, pentane, and the corresponding unsaturated compounds, e. g. propylene, amylene, pentadiene, methylacetylene, ethyl acetylene, vinyl acetylene, etc., but such complex mixture may be fractionally distilled to obtain a fraction consisting substantially of the hydrocarbons having 4 carbon atoms in the molecule. However, further separation of the hydrocarbons in such fraction by ordinary distillation is extremely difficult and impractical. The compounds, isobutylene, butylene-1 and butadiene-1.3, in particular have close to the same boiling point and distill together.

I have discovered that the butadiene and butylene ingredients of such mixture may readily be separated from one another by fractional distillation in the presence of sulphur dioxide at moderate temperatures and pressures. The sulphur dioxide apparently forms azeotropes with the butylene and butadiene which distill at sufficiently different temperatures to permit the separation. However, it is important that the mixture be maintained at moderate or low temperatures, e. g. below 70° C., during the distillation, since at higher temperatures fairly rapid chemical reaction between the sulphur dioxide and the butadiene, e. g. to form sulphones, may occur with resultant loss of a desired product and possible plugging of the apparatus by the sulphone product. However, by carrying the distillation out at temperatures below 70° C., particularly below 35° C., the formation of sulphones in objectionable amount may be avoided and the butylene and butadiene may efficiently be separated.

When the hydrocarbon mixture subjected to the distillation also contains butane and an acetylene having 4 carbon atoms in the molecule, the butane tends to distill in the first fraction together with sulphur dioxide and part or all of the butylene, whereas the acetylenic hydrocarbon remains in the residue together with the butadiene. The residual mixture of butadiene and the acetylenic hydrocarbon may then be separated into its components by careful fractional distillation in the absence of sulphur dioxide.

Other hydrocarbons such as ethane, propane, pentane, ethylene, propylene, or amylene, etc., may, of course, be present in the hydrocarbon mixture which is subjected to distillation together with sulphur dioxide, but their presence usually reduces somewhat the efficiency of the distillation and frequently necessitates the employment of sulphur dioxide in proportions considerably larger than would otherwise be required. Accordingly, such other hydrocarbons are preferably removed, e. g. by a preliminary ordinary distillation, prior to the distillation together with sulphur dioxide.

As hereinbefore mentioned, distillation of the hydrocarbon mixture together with sulphur dioxide is carried out at moderate temperatures and pressures, so as to avoid as nearly as possible chemical reaction between the sulphur dioxide and butadiene. It will be apparent that the longer the liquefied butadiene and sulphur dioxide remain admixed at a given temperature and pressure, the greater is the possibility of chemical reaction occurring. Accordingly, the distillation is preferably carried out in such manner as to maintain the butadiene and sulphur dioxide in admixture for as short a time as possible. This is most conveniently accomplished by admixing sulphur dioxide with the hydrocarbons shortly before or during the distillation and by carrying the distillation out in continuous manner. However, the distillation may satisfactorily be carried out in batchwise manner, if desired. When operating under the moderate temperature and pressure conditions herein required, the butadiene and sulphur dioxide may remain admixed for five hours or longer without forming sulphones in excessive amount. The tendency toward sulphone formation becomes less, and the time over which the sulphur dioxide and butadiene may satisfactorily remain admixed becomes greater, as the temperature and pressure at which the distillation is carried out are lowered. When carrying the distillation out at approximately atmospheric pressure or lower, there is little tendency toward the formation of sulphones.

The proportion of sulphur dioxide to be employed is dependent upon variable factors such as the kinds and proportions of hydrocarbons other than butylene and butadiene in the mixture, the pressure at which the distillation is carried out, etc., and cannot be stated exactly. However, when a mixture of butylene and butadiene is to be fractionally distilled together with sulphur dioxide at atmospheric pressure without return of the latter from the distillate, I usually employ about 1.7 parts by weight of sulphur dioxide per part of butylene. As the distilling pressure is reduced, the proportion of sulphur dioxide may be reduced somewhat. Also, by continuously or intermittently separating sulphur dioxide from the hydrocarbon in the distillate and returning it to the distillation, the proportion of sulphur dioxide may be reduced.

A particularly advantageous procedure is to employ the sulphur dioxide in approximately the proportion required to distill together with the hydrocarbons which are more saturated than butadiene, so as to obtain a residue of the latter in a form relatively free of sulphur dioxide and the more saturated hydrocarbons. If an acetylene having 4 or more carbon atoms in the molecule was present in the starting mixture, it is retained together with the residual butadiene. In such instances, the distillation may be continued in the absence of sulphur dioxide to separate the butadiene from the acetylenic hydrocarbon and recover each in purified form.

Such results may be accomplished in either a batchwise or continuous fractional distillation. For instance, in a continuous fractional distillation of a mixture of butane, butylene, butadiene, and vinyl acetylene, the hydrocarbon mixture and sufficient sulphur dioxide to azeotrope with the butane and butylene may be fed into a distilling column. Upon heating and refluxing the mixture within the column a mixture of sulphur dioxide, butane and butylene concentrates near the top of the column, butadiene concentrates in a zone part way up the column and vinyl acetylene concentrates toward the lower end of the column. The mixture of sulphur dioxide, butane and butylene may be withdrawn continuously as a top product, a portion preferably being returned near the top of the column for purpose of reflux; butadiene may be withdrawn as a side fraction from the column; and vinyl acetylene may be withdrawn from the lower end of the column as a bottom product. Sulphur dioxide is advantageously separated from the hydrocarbons in the top product (e. g. by extraction under pressure with water followed by separation of the sulphur dioxide from the extract and drying) and is returned continuously or intermittently to the distillation. Once such continuous distillation is started, the introduction of fresh quantities of sulphur dioxide to the distilling system may be discontinued, or nearly so, since, as just explained, the sulphur dioxide is recycled in the distilling system and the only fresh sulphur dioxide which may be required is that for replacement of any sulphur dioxide lost from the system. By operating as just described, the hydrocarbon mixture employed as the starting material may be fed continuously to a distilling system and butylene, butadiene, and vinyl acetylene, each in a form relatively free of other unsaturated hydrocarbons, be produced therefrom.

The following example describes one way in which the principle of the invention has been applied, but is not to be construed as limiting the invention.

Example

One part by weight of a liquefied cracked-oil gas fraction which contained approximately 50 per cent by weight of butadiene-1.3 and 50 per cent of butylenes (largely butylene-1, together with minor amounts of butylene-2 and isobutylene) was treated with approximately 0.76 part of liquid sulphur dioxide and the mixture was fractionally distilled at atmospheric pressure until approximately 88.4 per cent of the hydrocarbons in the original mixture had been collected in the several fractions of distillate. During the distillation a portion of the mixture of sulphur dioxide and hydrocarbons distilling was returned continuously near the top of the distilling column for purpose of reflux. Each fraction of distillate was treated to remove the sulfur dioxide therefrom and the residual hydrocarbon mixture was weighed and analyzed. The following table gives quantity of hydrocarbons in each fraction of distillate expressed as per cent by weight of the hydrocarbons in the mixture prior to the distillation. It also gives the per cent of butadiene and of butylenes in each fraction, based on the combined weight of the hydrocarbons present.

Table

| Fraction No. | Hydrocarbon content as percent of hydrocarbons in original mixture | Composition of hydrocarbons | |
|---|---|---|---|
| | | Butadiene, percent | Butylenes, percent |
| 1 | 23.4 | 6 | 94 |
| 2 | 19.3 | 35.8 | 64.2 |
| 3 | 17.1 | 63.7 | 36.3 |
| 4 | 28.6 | 77.3 | 22.7 |

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a continuous method for separating butylene and butadiene from a hydrocarbon mixture comprising the same, the steps which consist in fractionally distilling the hydrocarbon mixture in the presence of sulphur dioxide at a temperature below 70° C. to distill off a mixture comprising sulphur dioxide and butylene and thus obtain substantial separation of the butylene from the butadiene, continuously returning a portion of the distillate for purpose of reflux, withdrawing butadiene from a lower portion of the distilling column, and during said operations feeding sulphur dioxide and the hydrocarbon mixture to the distilling system, the sulphur dioxide being present during the distillation in amount sufficient to permit the distillation to be carried out with control of the distilling temperature.

2. In a continuous method for separating butylene and butadiene from a hydrocarbon mixture comprising the same, the steps which consist in fractionally distilling the hydrocarbon mixture in the presence of sulphur dioxide at such a temperature as to distill off a mixture comprising sulphur dioxide and butylene and thus obtain substantial separation of the butylene from the butadiene, continuously returning a portion of the distillate for purpose of reflux, withdrawing butadiene from a lower portion of the distilling column, and during said operations feeding sulphur dioxide and the hydrocarbon mixture to the distilling system, the sulphur dioxide being present during the distillation in amount sufficient to permit the distillation to be carried out with control of the distilling temperature.

3. In a method for separating butylene-1 from a hydrocarbon mixture comprising the same and butadiene, the steps which consist in fractionally distilling the hydrocarbon mixture in the presence of sulphur dioxide in the amount required to form a minimum boiling azeotrope with the butylene-1 but insufficient to form an azeotrope with the butadiene, the distillation being carried out at such a temperature as to distill off a mixture of sulphur dioxide and butylene-1, during the distillation continuously returning a portion of the distillate for purpose of reflux, continuing the distillation until the butylene-1 is substantially removed, and withdrawing the butadiene as a liquid residue.

4. In a continuous method for the separation of butylene-1 from a hydrocarbon mixture comprising the same and butadiene, the steps which consist in fractionally distilling the hydrocarbon mixture in the presence of sulphur dioxide in the amount required to form a minimum boiling azeotrope with the butylene-1 but insufficient to form an azeotrope with the butadiene, the fractional distillation being carried out at such a temperature as to distill off a mixture comprising sulphur dioxide and butylene-1 and thus obtain substantial separation of the butylene-1 from the butadiene, continuously returning a portion of the distillate for purpose of reflux, withdrawing butadiene from a lower portion of the distilling column and during said operations feeding sulphur dioxide and the hydrocarbon mixture to the distilling system.

5. In a method for separating butylene and butadiene from a hydrocarbon mixture comprising the same, the steps which comprise fractionally distilling the hydrocarbon mixture in the presence of sulphur dioxide at such a temperature as to distill off a mixture comprising sulphur dioxide and butylene and thus obtain substantial separation of the butylene from the butadiene, and continuously returning a portion of the distillate for the purpose of reflux, the sulphur dioxide being present during the distillation in amount sufficient to permit the distillation to be carried out with control of the distilling temperature.

CHARLES L. GREGG.